(12) United States Patent
Heeter et al.

(10) Patent No.: US 12,025,059 B1
(45) Date of Patent: Jul. 2, 2024

(54) DISTRIBUTED ELECTRIC TIP FANS FOR DISTORTION TOLERANCE OF TURBOFAN ENGINES

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Kathryn A. Sontag, Indianapolis, IN (US); Michael G. Meyer, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/088,994

(22) Filed: Dec. 27, 2022

(51) Int. Cl.
 *F02C 9/20* (2006.01)
 *F02C 3/04* (2006.01)
 *F02C 6/00* (2006.01)

(52) U.S. Cl.
 CPC .................. *F02C 9/20* (2013.01); *F02C 3/04* (2013.01); *F02C 6/00* (2013.01); *F05D 2220/32* (2013.01); *F05D 2220/70* (2013.01); *F05D 2270/05* (2013.01); *F05D 2270/101* (2013.01)

(58) Field of Classification Search
 CPC .... F02C 3/04; F02C 3/107; F02C 6/00; F02C 9/16; F02C 9/20
 See application file for complete search history.

(56) References Cited

U.S. PATENT DOCUMENTS

| | | | |
|---|---|---|---|
| 4,655,413 | A | 4/1987 | Genssler et al. |
| 7,637,455 | B2 | 12/2009 | Silkey et al. |
| 7,926,290 | B2 | 4/2011 | Johnson et al. |
| 7,975,961 | B2 | 7/2011 | Silkey et al. |
| 10,704,418 | B2 | 7/2020 | Ramakrishnan et al. |
| 11,149,639 | B2 | 10/2021 | Duge |
| 2019/0138663 | A1 | 5/2019 | Ferrar et al. |

FOREIGN PATENT DOCUMENTS

| | | | |
|---|---|---|---|
| CN | 106441789 | 2/2017 | |
| EP | 4086167 A1 * | 11/2022 | ............ B64C 21/06 |
| WO | 2020113110 | 6/2020 | |

OTHER PUBLICATIONS

Justin M. Bailey, The Influence of Development and Fan/Screen Interaction on Screen-Generated Total Pressure Distortion Profiles, Dec. 5, 2013.
Aaron Drake et al., Environmentally Responsible Aviation N+2 Advanced Vehicle Study: Final Technical Report, Apr. 30, 2013.

* cited by examiner

*Primary Examiner* — Arun Goyal
(74) *Attorney, Agent, or Firm* — Barnes & Thornburg LLP (57) ABSTRACT

A gas turbine engine comprises a primary fan and an engine core. The primary fan is mounted for rotation about an axis of the gas turbine engine to provide thrust. The engine core is coupled to the primary fan and configured to drive the primary fan about the axis to cause the fan to push air to provide thrust for the gas turbine engine.

20 Claims, 6 Drawing Sheets

DISTRIBUTED ELECTRIC TIP FANS FOR DISTORTION TOLERANCE OF TURBOFAN ENGINES

STATEMENT REGARDING FEDERALLY SPONSORED RESEARCH OR DEVELOPMENT

Embodiments of the present disclosure were made with government support under Contract No. FA8650-19-D-2063. The government may have certain rights.

FIELD OF THE DISCLOSURE

The present disclosure relates generally to gas turbine engines, and more specifically to distortion mitigation in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce pressure and swirl distortions.

SUMMARY

The present disclosure may comprise one or more of the following features and combinations thereof.

A gas turbine engine may include a primary fan, an engine core, and an auxiliary fan array. The primary fan may be mounted for rotation about an axis of the gas turbine engine to provide thrust. The engine core may be coupled to the primary fan and may be configured to drive the primary fan about the axis to cause the fan to push air to provide thrust for the gas turbine engine. The auxiliary fan system may be configured to augment the flow of air through the gas turbine engine to help offset and minimize the pressure and swirl distortions in the gas turbine engine.

In some embodiments, the primary fan may include a fan rotor, a plurality of fan blades, an inner fan case, and an outer fan case. The plurality of fan blades may extend radially outward from the fan rotor. The inner fan case may extend circumferentially around the axis of the gas turbine engine radially outward of the plurality of fan blades. The outer case may extend circumferentially around the axis of the gas turbine engine radially outward of the inner fan case to define a portion of a flow path of the gas turbine engine.

In some embodiments, the engine core may include a compressor, a combustor, and a turbine. The compressor may be configured to rotate about the axis of the gas turbine engine to compress the air that flows from the primary fan. The combustor may be configured to receive the compressed air from the compressor. The turbine may be coupled to the compressor and the primary fan and may be configured to rotate about the axis of the gas turbine engine in response to receiving hot, high-pressure products of the combustor to drive rotation of the compressor and the fan.

In some embodiments, the auxiliary fan system may include an auxiliary fan array and a control unit. The auxiliary fan array may be located radially between the inner fan case and the outer case of the primary fan. The auxiliary fan array may be located axially in line with the primary fan. The control unit may be coupled to the auxiliary fan array.

In some embodiments, the auxiliary fan array may have a plurality of electric fans spaced apart around the axis of the gas turbine engine. The plurality of electric fans may each be configured to rotate about a fan axis. The control unit may be configured to vary individually a rotation speed of each electric fan included in the auxiliary fan array in response to a pressure differential in the flow path of the gas turbine engine upstream of the engine core to minimize pressure and swirl distortions in the gas turbine engine.

In some embodiments, the control unit may include a plurality of sensors and a controller. The plurality of sensors may be arranged to measure pressure within the flow path of the gas turbine engine upstream of the engine core. The controller may be coupled to the plurality of sensors to receive pressure measurements from the plurality of sensors.

In some embodiments, the controller may be configured to increase the rotation speed of at least one electric fan included in the auxiliary fan array in response to the pressure measurement being above a predetermined threshold. The controller may be configured to decrease the rotation speed of at least one electric fan included in the auxiliary fan array in response to the pressure measurement being below the predetermined threshold.

In some embodiments, the control unit may further include a memory coupled to the controller. The memory may include a plurality of preprogrammed aircraft maneuvers that each correspond to a predetermined speed profile for the auxiliary fan array. The controller may be configured to detect a preprogrammed aircraft maneuver included in the plurality of preprogrammed aircraft maneuvers on the memory and direct the auxiliary fan array to change to the corresponding predetermined speed profile in response to detecting the preprogrammed aircraft maneuver.

In some embodiments, the plurality of electric fans may each be configured to pivot relative to the outer case of the primary fan. The controller may be configured to direct at least one electric fan included in the plurality of electric fans to pivot in response to the pressure measurements from the plurality of sensors and/or the preprogrammed aircraft maneuver.

In some embodiments, the control unit may include a controller and a memory coupled to the controller. The memory may include a plurality of preprogrammed aircraft maneuvers that each correspond to a predetermined speed profile for the auxiliary fan array. The controller may be configured to detect a preprogrammed aircraft maneuver included in the plurality of preprogrammed aircraft maneuvers on the memory. The controller may be configured to direct the auxiliary fan array to change to the corresponding predetermined speed profile in response to detecting the preprogrammed aircraft maneuver.

In some embodiments, the plurality of electric fans included in the auxiliary fan array may include a first set of electric fans having a first diameter, a second set of electric fans having the first diameter, a third set of electric fans having a second diameter, and a fourth set of electric fans having the second diameter. The second set of electric fans may be spaced apart circumferentially from the first set of electric fans. The third set of electric fans may be located circumferentially between the first set of electric fans and the second set of electric fans. The fourth set of electric fans may be located circumferentially between the first set of electric fans and the second set of electric fans.

In some embodiments, the second diameter may be greater than the first diameter. The fourth set of electric fans may be spaced apart circumferentially from the third set of electric fans.

In some embodiments, the first set of electric fans and the second set of electric fans may each have a rotor, blades, and a nacelle. The third set of electric fans and the fourth set of electric fans may each have a rotor, blades, and a nacelle. The nacelles of the first set of electric fans and the second set of electric fans may have a first axial length. The nacelles of the third set of electric fans and the fourth set of electric fans may have a second axial length greater than the first axial length.

In some embodiments, the primary fan may have a first diameter. The plurality of electric fans included in the auxiliary fan array may have a second diameter less than the first diameter. In some embodiments, the outer case may have a non-circular cross-section.

According to another aspect of the present disclosure, a gas turbine engine may include a primary fan, an engine core, and an auxiliary fan system. The primary fan may be mounted for rotation about an axis of the gas turbine engine to provide thrust. The engine core may be coupled to the primary fan and configured to drive the primary fan about the axis.

In some embodiments, the auxiliary fan system may include an auxiliary fan array located radially outward of the primary fan and a control unit coupled to the auxiliary fan array, the auxiliary fan array having a plurality of electric fans spaced apart around the axis of the gas turbine engine that are each configured to rotate about a fan axis, and the control unit configured to vary individually a rotation speed of each electric fan included in the auxiliary fan array in response to a pressure differential in a flow path of the gas turbine engine upstream of the engine core.

In some embodiments, the control unit may include a plurality of sensors and a controller. The plurality of sensors may be arranged to measure pressure within the flow path of the gas turbine engine upstream of the engine core. The controller may be coupled to the plurality of sensors to receive pressure measurements from the plurality of sensors. The controller may be configured to increase the rotation speed of at least one electric fan included in the auxiliary fan array in response to the pressure measurement being above a predetermined threshold and to decrease the rotation speed of at least one electric fan included in the auxiliary fan array in response to the pressure measurement being below the predetermined threshold.

The control unit may include a controller and a memory coupled to the controller. The memory may include a plurality of preprogrammed aircraft maneuvers that each correspond to a predetermined speed profile for the auxiliary fan array. The controller may be configured to detect a preprogrammed aircraft maneuver included in the plurality of preprogrammed aircraft maneuvers on the memory and direct the auxiliary fan array to change to the corresponding predetermined speed profile in response to detecting the preprogrammed aircraft maneuver.

In some embodiments, the plurality of electric fans may each be configured to pivot relative to the primary fan. The control unit may be configured to direct at least one electric fan included in the plurality of electric fans to pivot in response to the pressure differential in the flow path of the gas turbine engine upstream of the engine core.

In some embodiments, the auxiliary fan array may be axially aligned with the primary fan. The plurality of electric fans may be axially aligned with the primary fan.

In some embodiments, the plurality of electric fans included in the auxiliary fan array may include a first set of electric fans having a first diameter, a second set of electric fans having the first diameter and spaced apart circumferentially from the first set of electric fans, a third set of electric fans having a second diameter and located circumferentially between the first set of electric fans and the second set of electric fans, and a fourth set of electric fans having the second diameter and located circumferentially between the first set of electric fans and the second set of electric fans. The second diameter may be greater than the first diameter. The fourth set of electric fans may be spaced apart circumferentially from the third set of electric fans.

In some embodiments, the first set of electric fans and the second set of electric fans each have a rotor, blades, and a nacelle. The third set of electric fans and the fourth set of electric fans each may have a rotor, blades, and a nacelle. The nacelles of the first set of electric fans and the second set of electric fans may have a first axial length. The nacelles of the third set of electric fans and the fourth set of electric fans may have a second axial length greater than the first axial length.

In some embodiments, the primary fan may have a first diameter. The plurality of electric fans included in the auxiliary fan array may have a second diameter less than the first diameter.

In some embodiments, the gas turbine engine may further include an outer engine case arranged around the primary fan, the engine core, and the auxiliary fan array. The outer engine case may have a non-circular cross-section.

According to another aspect of the present disclosure, a method may include providing a gas turbine engine. The gas turbine engine may include a primary fan mounted for rotation about an axis to provide thrust, an engine core coupled to the primary fan and configured to drive the primary fan about the axis, and an auxiliary fan system. The auxiliary fan system may include an auxiliary fan array located radially outward of the primary fan having a plurality of electric fans spaced apart around the axis that are each configured to rotate about a fan axis.

In some embodiments, the method may further include conducting a flow of air through a flow path of the gas turbine engine, measuring pressure of the flow of air in the flow path of the gas turbine engine axially forward of the engine core, and varying a rotation speed of at least one electric fan included in the auxiliary fan array. The rotation speed of the electric fans may be varied in response to the pressure measurements being above or below a predetermined threshold to minimize pressure and swirl distortions in the gas turbine engine.

In some embodiments, the auxiliary fan system may further include a memory having a plurality of preprogrammed aircraft maneuvers that each correspond to a predetermined speed profile for the auxiliary fan array. The method may further include detecting a preprogrammed aircraft maneuver included in the plurality of preprogrammed aircraft maneuvers stored on the memory and directing the auxiliary fan array to change to the corresponding predetermined speed profile in response to detecting the preprogrammed aircraft maneuver.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
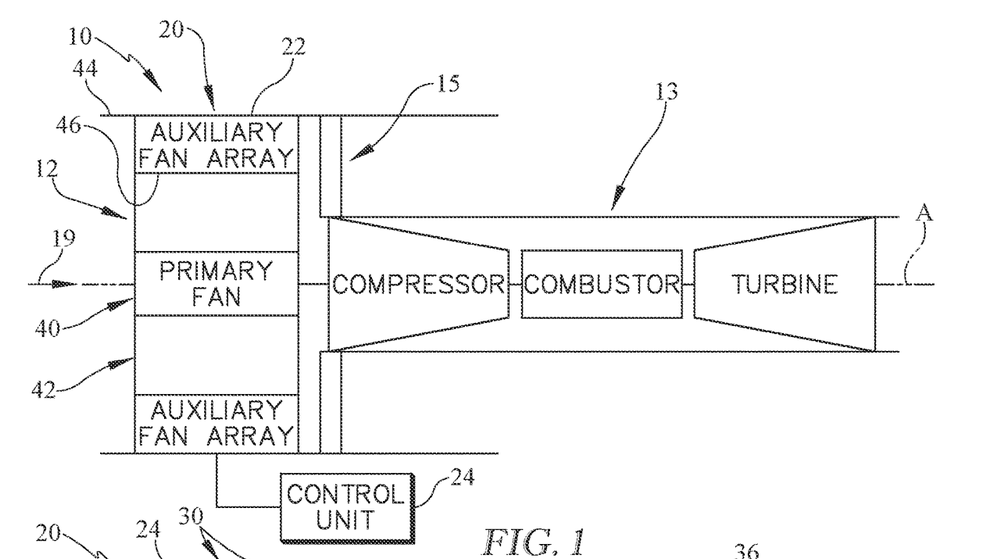
FIG. 1 is a diagrammatic view of a gas turbine engine that includes a primary fan mounted for rotation about an axis of the gas turbine engine to provide thrust, an engine core coupled to the primary fan and configured to drive the primary fan about the axis to cause the fan to push air to provide thrust for the gas turbine engine, and an auxiliary fan system including an auxiliary fan array axially aligned with the primary fan that is configured to augment the flow of air through the gas turbine engine to help offset and minimize the pressure and swirl distortions in the gas turbine engine.
Figure 2:
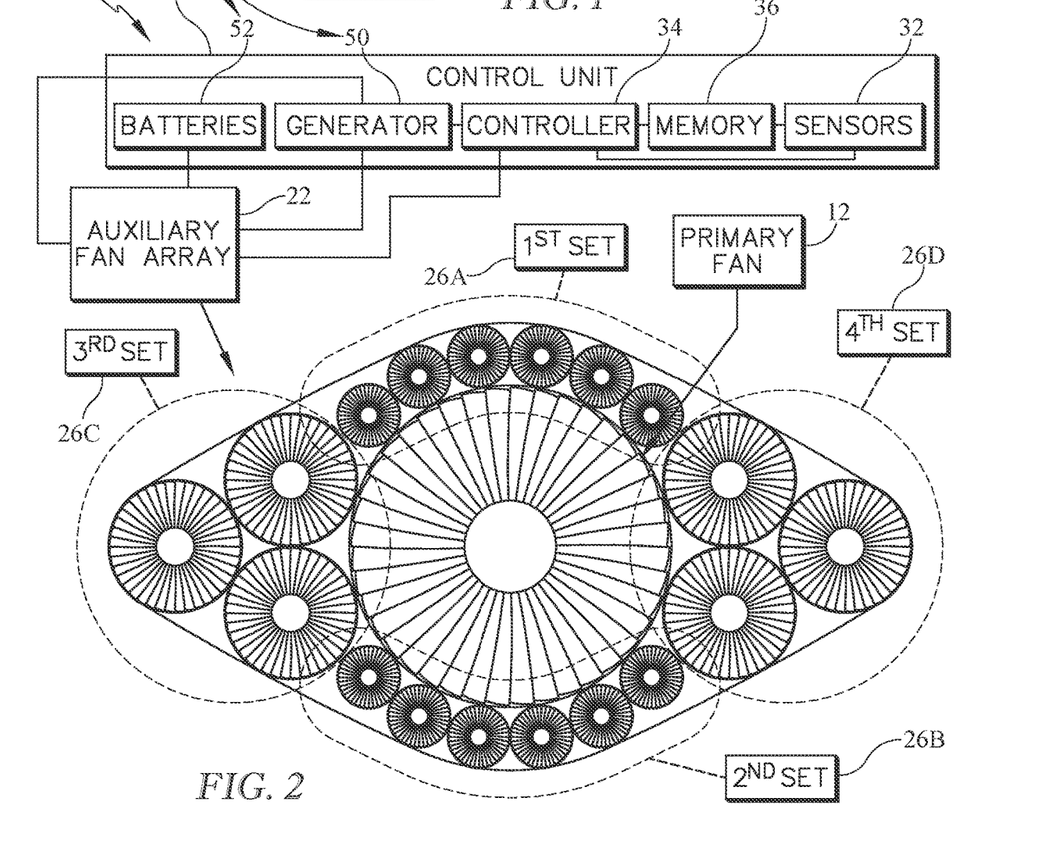
FIG. 2 is a diagrammatic and cross-section view of the gas turbine engine of FIG. 1 showing the auxiliary fan system includes the auxiliary fan array having a plurality of electric fans spaced apart around the axis of the gas turbine engine and a control unit coupled to the auxiliary fan array to individually control the rotation speed of each electric fan included in the auxiliary fan array in response to a pressure differential in the flow path of the gas turbine engine upstream of the engine core.
Figure 3:
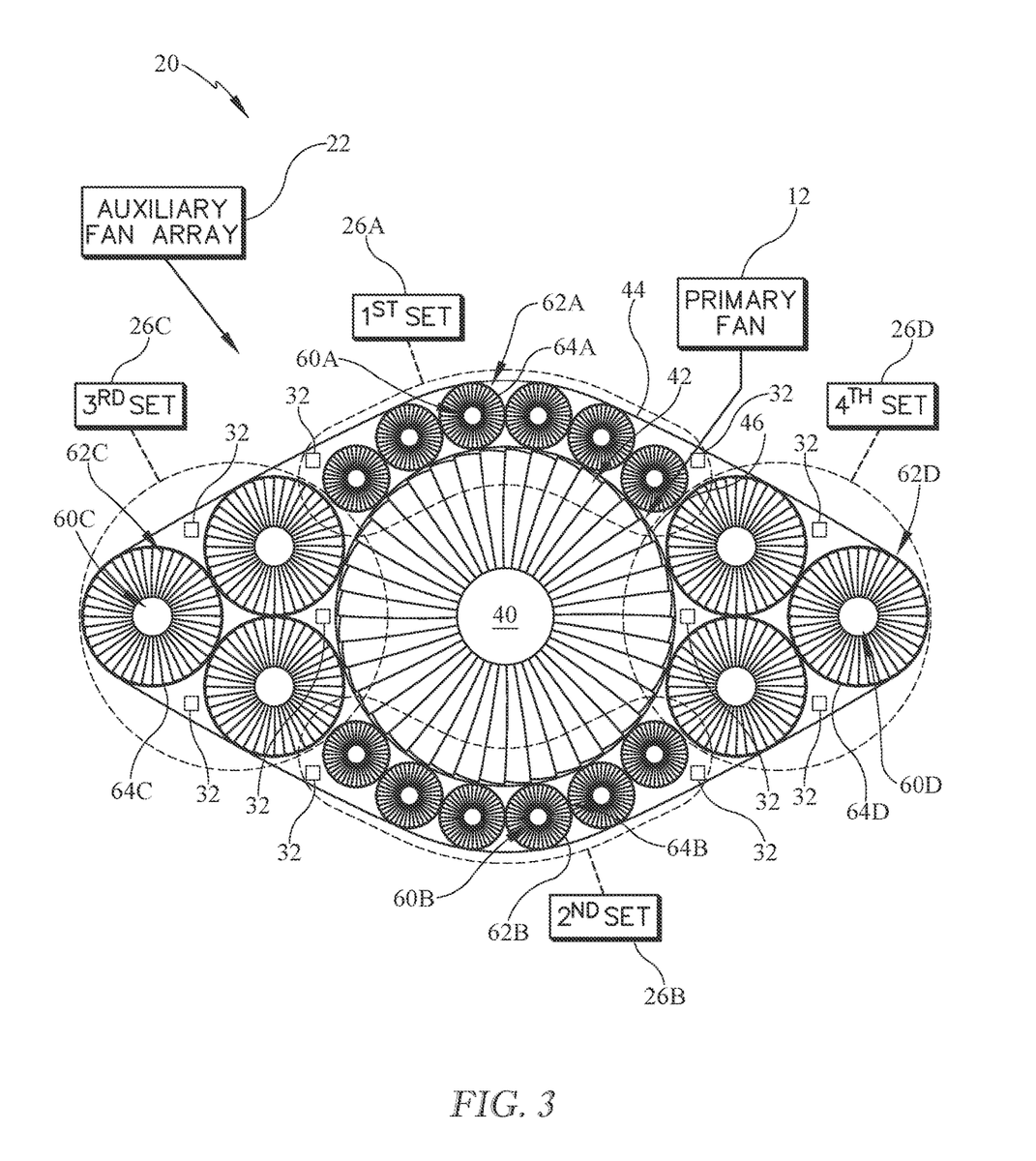
FIG. 3 is view similar to FIG. 2 showing the plurality of electric fans included in the auxiliary fan array includes a first set of electric fans having a first diameter, a second set of electric fans having the first diameter, a third set of electric fans having a second diameter greater than the first diameter, and a fourth set of electric fans having the second diameter.

An illustrative aerospace gas turbine engine 10 includes a primary fan 12, an engine core 13, and an auxiliary fan system 20 as shown in FIGS. 1-3. The primary fan 12 is mounted for rotation about an axis A of the gas turbine engine 10 to provide thrust. The engine core 13 is coupled to the primary fan 12 and configured to drive rotation of the primary fan 12 about the axis to cause the fan 12 to push air to provide thrust for the gas turbine engine 10. The auxiliary fan system 20 includes an auxiliary fan array 22 axially aligned with the primary fan 12 that is configured to augment the flow of air through the gas turbine engine 10 to help offset and minimize the pressure and swirl distortions in the gas turbine engine 10.

The auxiliary fan system 20 includes the auxiliary fan array 22 and a control unit 24 as shown in FIGS. 1-3. The auxiliary fan array 22 has a plurality of electric fans 26A, 26B, 26C, 26D spaced apart around the axis A of the gas turbine engine 10. The control unit 24 is coupled to the auxiliary fan array 22 to individually control the rotation speed of each electric fan 26A, 26B, 26C, 26D included in the auxiliary fan array 22 in response to a pressure differential in a flow path 19 of the gas turbine engine 10 upstream of the engine core 13.

Embedded engines on an aircraft may experience high distortion in the form of pressure gradients and swirl. The pressure and swirl distortions may cause engine stall or other undesirable aeromechanical behavior. Therefore, the gas turbine engine 10 includes the auxiliary fan system 20 with a plurality of electric fans 26A, 26B, 26C, 26D which allow for individual control of various flows around the circumference of the gas turbine engine 10. By varying the speeds of the different electric fans around the circumference of the engine 10, a circumferentially varying flow environment is stablished to offset or otherwise mitigate the inlet pressure and swirl distortions.

The control unit 24 includes a power supply 30, sensors 32, a controller 34 including a processor, and a memory 36 as shown in FIG. 2. The power supply 30 is coupled to each of the electric fans 26A, 26B, 26C, 26D to provide power to each of the electric fans 26A, 26B, 26C, 26D. The plurality of sensors 32 arranged to measure pressure within the flow path 19 of the gas turbine engine 10 upstream of the engine core 13. The controller 34 is coupled to each of the electric fans 26A, 26B, 26C, 26D and the power supply 30. The controller 34 is also coupled to the plurality of sensors 32 to receive pressure measurements from the plurality of sensors 32. The memory 36 is coupled to the controller 34 and has a plurality of preprogrammed aircraft maneuvers that each correspond to a predetermined speed profile for the auxiliary fan array 22.

Based on the pressure measurements and/or the detected preprogrammed aircraft maneuvers, the controller 34 is configured to individually increase, decrease, and/or maintain the speed of each of the electric fans 26A, 26B, 26C, 26D. The controller 34 is configured to increase the rotation speed of at least one electric fan 26A, 26B, 26C, 26D included in the auxiliary fan array 22 in response to the pressure measurement from the sensors 32 being above a predetermined threshold. The controller 34 is configured to decrease the rotation speed of at least one electric fan 26A, 26B, 26C, 26D included in the auxiliary fan array 22 in response to the pressure measurement being below the predetermined threshold.

The controller 34 may also be configured to maintain the rotation speed of at least one electric fan 26A, 26B, 26C, 26D included in the auxiliary fan array 22 if the pressure measurements are within the predetermined threshold. Alternatively, the controller 34 may be configured to stop rotation of at least one electric fan 26A, 26B, 26C, 26D included in the auxiliary fan array 22 if the pressure measurements are within the predetermined threshold.

In the illustrative embodiment, the controller 34 is configured to increase the rotation speed of the electric fan or fans 26A, 26B, 26C, 26D included in the auxiliary fan array 22 at or near the area of the flow path 19 where the pressure measurement from the sensors 32 is above a predetermined threshold. Similarly, the controller 34 is configured to decrease the rotation speed of the electric fan or fans 26A, 26B, 26C, 26D included in the auxiliary fan array 22 at or near the area of the flow path 19 where the pressure measurement from the sensors 32 is below a predetermined threshold.

For instance, the controller 34 may direct electric fans 26A, 26B, 26C, 26D at one location around the circumference of the engine 10 to increase rotation speed, while also directing other electric fans 26A, 26B, 26C, 26D included in the auxiliary fan array 22 at another location to decrease in rotation speed. Whether the speed of each of the electric fans 26A, 26B, 26C, 26D is increased, decreased, and/or maintained depends on the pressure gradient in the flow path 19 of the engine 10. In areas of high pressure, the rotation speed of the fans 26A, 26B, 26C, 26D is increased. In areas of low pressure, the rotation speed of the fans 26A, 26B, 26C, 26D is decreased. In areas where the pressure is within the desired threshold, the speed of the fans 26A, 26B, 26C, 26D may be maintained.

The controller 34 is also configured to maintain demanded thrust for the engine 10. Therefore, the controller 34 is configured to vary the rotation speed of the fans 26 to adjust the pressure while still meeting the overall thrust needed for the engine 10. Therefore, mitigation speeds may be relative to the overall distribution of pressure.

The controller 34 is also configured to detect a preprogrammed aircraft maneuver included in the plurality of preprogrammed aircraft maneuvers on the memory 36. The controller 34 is configured to direct the auxiliary fan array 22 to change to the corresponding predetermined speed profile in response to detecting the preprogrammed aircraft maneuver.

The predetermined speed profile includes a preset speed and position for each of the fans 26A, 26B, 26C, 26D included in the auxiliary fan array 22. For example, based on the preprogrammed aircraft maneuver, i.e. banks, turns, rolls, etc., the pressure gradient experienced by the gas turbine engine 10 can be predicted such that the rotation speed of the fans 26A, 26B, 26C, 26D can be altered preemptively to minimize the distortions. The speed and position of each fan 26A, 26B, 26C, 26D creates the predetermined speed profile that corresponds to the aircraft maneuver so that whenever the controller 34 detects the preprogrammed aircraft maneuver, the controller 34 directs the auxiliary fan array 22 to the corresponding predetermined speed profile to counter the predicted pressure distortions that will result from the aircraft maneuver.

In some embodiments, other sensors on the aircraft may detect different orientations of the aircraft that correspond to one of the preprogrammed aircraft maneuvers and provide the information to the controller 34. The controller 34 is configured to direct the auxiliary fan array 22 to change to the corresponding predetermined speed profile in response to the other sensor detecting the preprogrammed aircraft maneuver. In the illustrative embodiment, the controller 34 may be configured to use a combination of the pressure measurements and the detected preprogrammed aircraft maneuver to control the rotation speeds of each of the electric fans 26A, 26B, 26C, 26D.

In some embodiments, the plurality of electric fans 26A, 26B, 26C, 26D may each be configured to pivot relative to an outer case 44 of the primary fan 12. The controller 34 may be configured to direct at least one of the electric fans 26A, 26B, 26C, 26D to pivot in response to the pressure measurements from the plurality of sensors 32.

Each of the electric fans 26A, 26B, 26C, 26D included in the auxiliary fan array 22 may include a holder and an actuator (not shown). The holder allows the fan 26A, 26B, 26C, 26D to be pivoted relative to the outer case 44. The actuator is coupled the controller 34. The controller 34 may be configured to direct the actuator to pivot the fan 26A, 26B, 26C, 26D so as to change the direction the fan 26A, 26B, 26C, 26D is facing. Altering the direction of the fans 26A, 26B, 26C, 26D may help mitigate swirl or allow for more active tailoring of distortion response.

Turning again to the gas turbine engine 10, the gas turbine engine 10 includes the primary fan 12, the engine core 13, a plurality of struts 15, and the auxiliary fan system 20 as shown in FIGS. 1-3. The plurality of struts 15 may be outlet guide vanes that each extend between the outer case of the primary fan 12 and the engine core 13. The struts 15 are spaced apart circumferentially around the axis A. In the illustrative embodiment, the electric fans 26A, 26B, 26C, 26D are axially aligned with the primary fan 12 so that the electric fans 26A, 26B, 26C, 26D are axially forward of the struts 15.

The primary fan 12, the primary fan 12 includes a fan rotor 40, a plurality of fan blades 42, and an outer case 44, and an inner fan case or nacelle 46 as shown in FIG. 3. The plurality of fan blades 42 each extend radially outward from the fan rotor 40. The outer case 44 extends circumferentially around the axis A of the gas turbine engine 10 radially outward of the fan blades 42 to define a portion of the flow path 19 of the gas turbine engine 10. The inner fan case 46 extends circumferentially around the axis A of the gas turbine engine 10 radially outward of the fan blades 42 and radially inward of the outer case 44. In the illustrative embodiment, the engine core 13 is arranged radially inward of the outer case 44 to create a bypass duct between the outer case 44 and the engine core 13 as shown in FIG. 1.

The engine core 13 includes a compressor 14, a combustor 16, and a turbine 18 as shown in FIG. 1. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis A and drive the compressor 14 and the primary fan 12. The primary fan 12 is driven by the turbine 18 and provides thrust for propelling an air vehicle.

The auxiliary fan system 20 includes the auxiliary fan array 22 and the control unit 24 as shown in FIGS. 1-3. The auxiliary fan array 22 includes the plurality of electric fans 26A, 26B, 26C, 26D. The auxiliary fan array 22 is non-circular in the illustrative embodiment. Instead, the auxiliary fan array 22 is a parallelogram array as shown in FIGS. 2-5.

The auxiliary fan array 22 includes the plurality of electric fans 26A, 26B, 26C, 26D as shown in FIGS. 2-5. The plurality of electric fans 26A, 26B, 26C, 26D include a first set of electric fans 26A, a second set of electric fans 26B, a third set of electric fans 26C, and a fourth set of electric fans 26D. The second set of electric fans 26B are spaced apart circumferentially from the first set of electric fans 26A. The third set of electric fans 26C and the fourth set of electric fans 26D are located circumferentially between the first set of electric fans 26A and the second set of electric fans 26B on opposite sides of the primary fan 12. The fourth set of electric fans 26D is spaced apart circumferentially from the third set of electric fans 26C.

The first and second sets of electric fans 26A, 26B have a first diameter, while the third and fourth sets of electric fans 26C, 26D have a second diameter as shown in FIGS. 2 and 3. The second diameter is greater than the first diameter in the illustrative embodiment. By using different sized electric fans 26A, 26B, 26C, 26D in the auxiliary fan array 22, gaps between the inner fan case 46 and the outer case 44. In some embodiments, the outer case 44 may be a duct.

Figure 4:
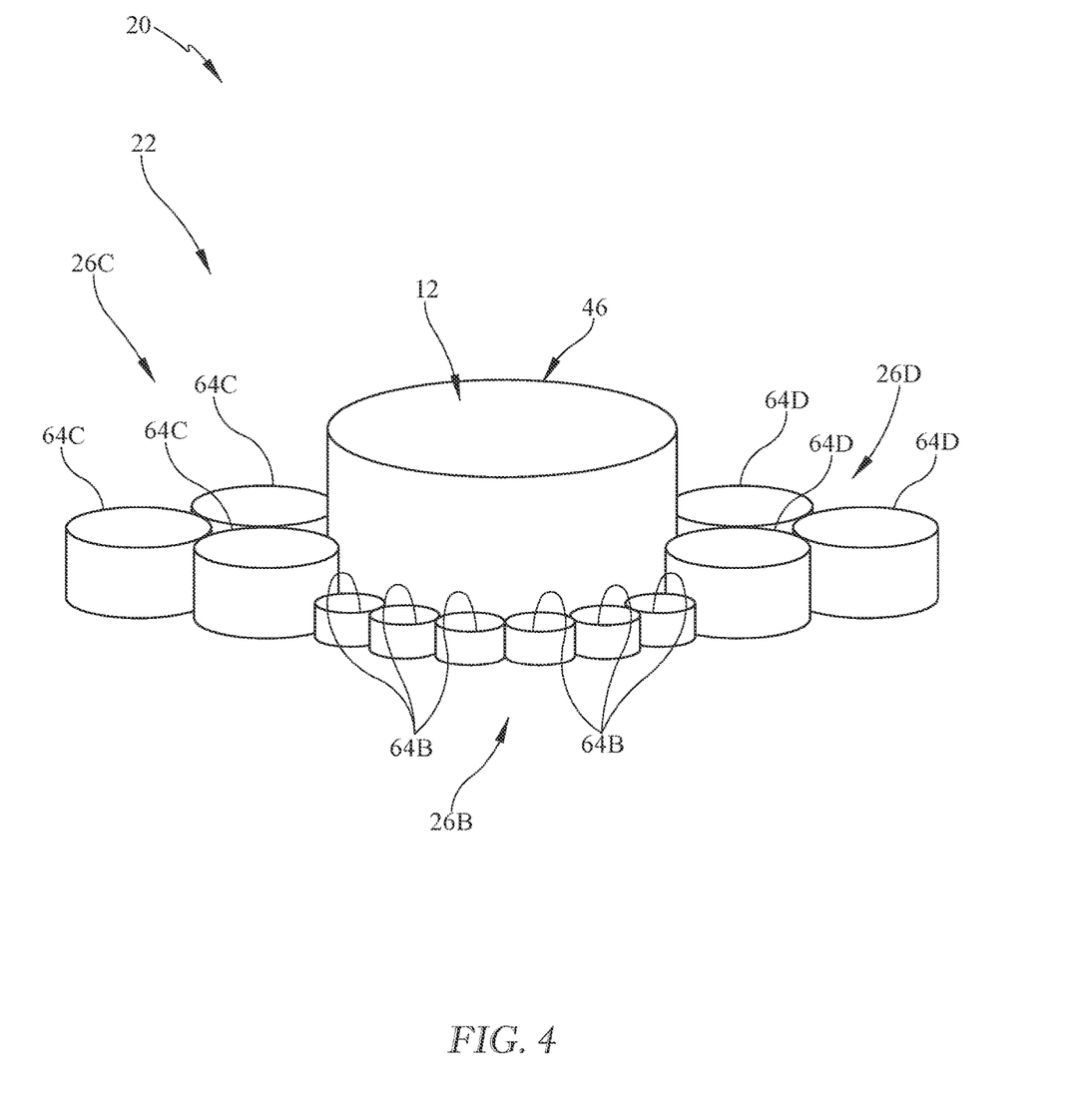
FIG. 4 is a perspective view of the auxiliary fan array of FIG. 3 showing the primary fan and each of the electric fans includes a nacelle that extends axially, and further showing the nacelles of the first set of fans and the second set of fans have a first axial length, the nacelles of the third set of fans and the fourth set of fans have a second axial length greater than the first axial length, and the nacelle or inner fan case of the primary fan has a third axial length that is greater than the first and second axial lengths.
Figure 5:
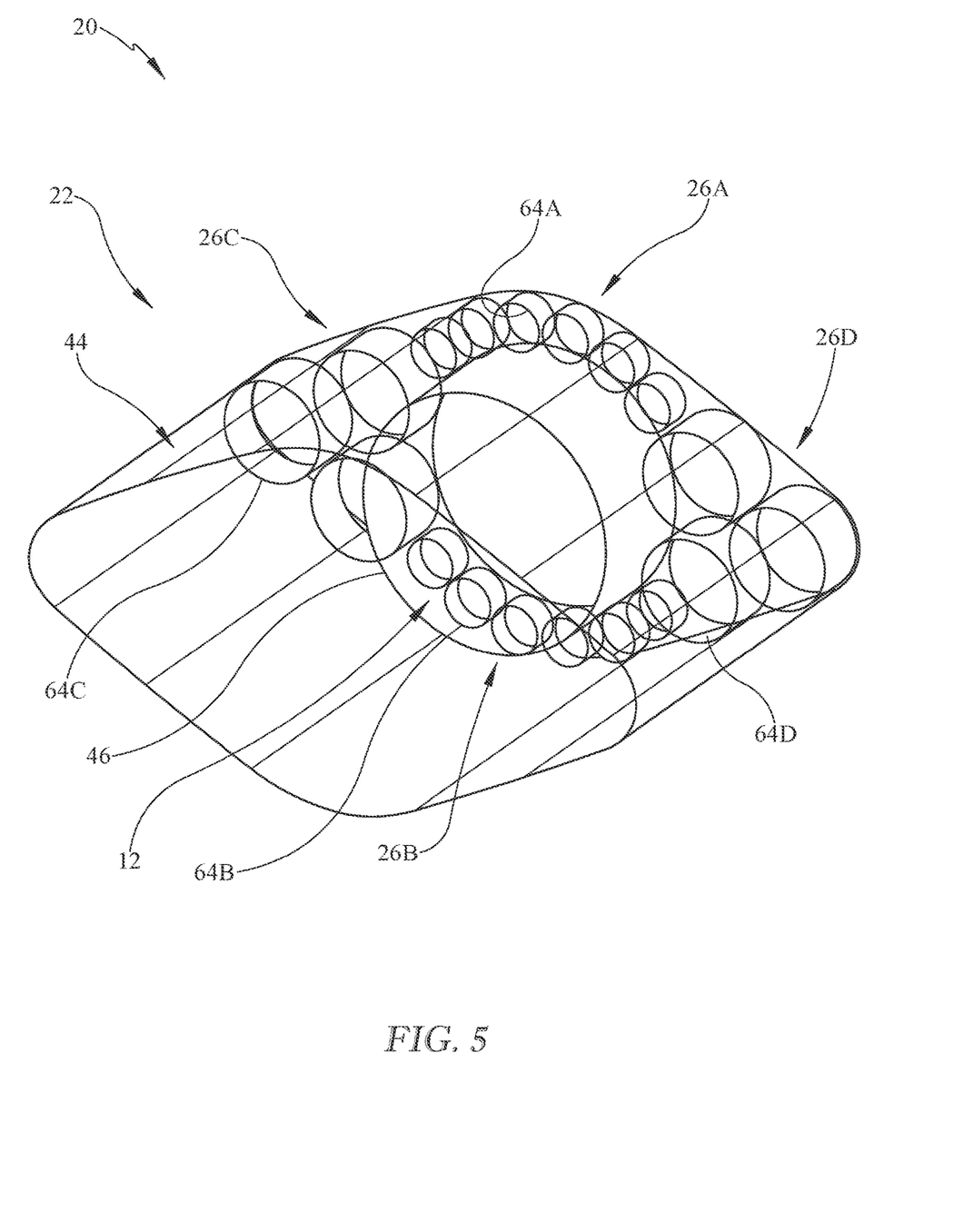
FIG. 5 is a perspective view of the auxiliary fan array of FIG. 3 showing the engine includes an outer case or duct with a non-circular shape.
Figure 6:
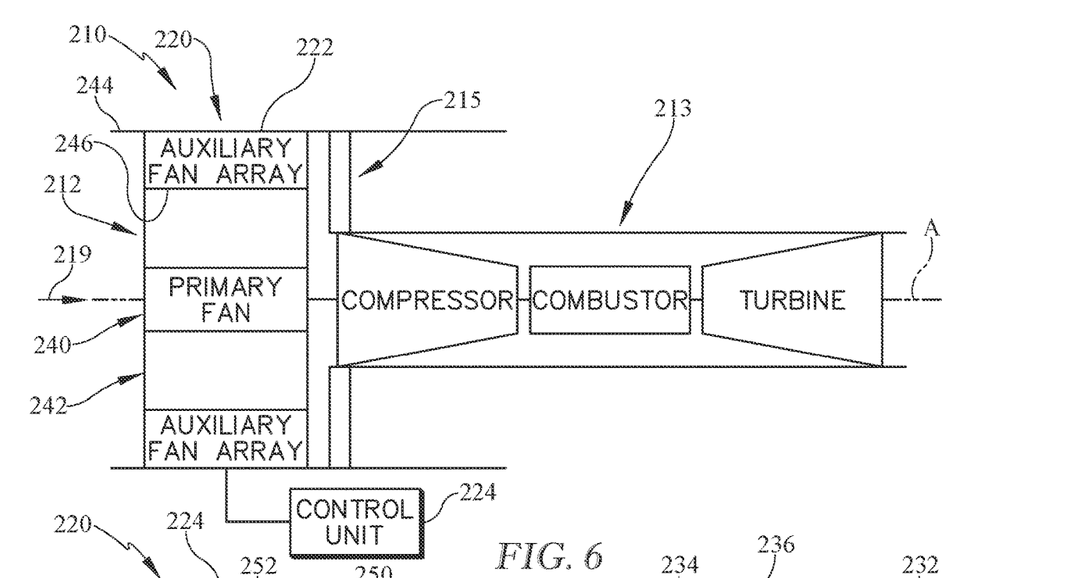
FIG. 6 is a diagrammatic view of another embodiment of an auxiliary fan system in a gas turbine engine showing the auxiliary fan system includes an auxiliary fan array that is axially aligned with the primary fan radially between fan blades of the primary fan and an outer case of the primary fan and a control unit coupled to the auxiliary fan array to individually control the rotation speed of each electric fan included in the auxiliary fan array.

In the illustrative embodiment, each set of electric fans 26A-D has a rotor 60A, 60B, 60C, 60D, blades 62A, 62B, 62C, 62D, and a nacelle 64A, 64B, 64C, 64D as shown in FIGS. 3-5. The nacelles 64A, 64B of the first set of electric fans 26A and the second set of electric fans 26B have a first axial length, while the nacelles 64C, 64D of the third set of electric fans 26C and the fourth set of electric fans 26D have a second axial length as shown in FIGS. 5 and 6. The second axial length is greater than the first axial length in the illustrative embodiment.

The inner fan case 46 has a third axial length as shown in FIGS. 5 and 6. The third axial length is greater than the first and second axial lengths of the nacelles 64A, 64B, 64C, 64D of each set of electric fans 26A-D.

The control unit 24 is coupled to the auxiliary fan array 22 to individually control the rotation speed of each electric fan 26A, 26B, 26C, 26D included in the auxiliary fan array 22. The control unit 24 includes the power supply 30, the sensors 32, the controller 34, and the memory 36 as shown in FIG. 2.

The power supply 30 can be any suitable source of power or electricity. In the illustrative embodiment, the power supply 30 includes a generator 50 and batteries 52 as shown in FIG. 2. The generator 50 is coupled to the engine core 13 to produce electricity during use of the engine core 13 in the illustrative embodiment. The generator 50 is coupled to the auxiliary fan array 22 to supply power to the auxiliary fan array 22 to drive rotation of the plurality of electric fans 26A, 26B, 26C, 26D. The batteries 52 are coupled to the generator 50 to store electricity produced by the generator 50. The batteries 52 are also coupled to the auxiliary fan array 22 to supply power to the auxiliary fan array 22.

In the illustrative embodiment, the generator 50 may be coupled to a second engine core or small turboshaft. In the illustrative embodiment, additional generators 50 may be included in the aircraft to power the auxiliary fan system 20.

In the illustrative embodiment, the batteries 52 may supplement the power supplied by the generator 50 to the fan array 22. The batteries 52 may supply power to the auxiliary fan array 22 during takeoff of the aircraft and/or other higher demand conditions. In some embodiments, the batteries 52 may supply power to the auxiliary fan array 22 during cruise conditions or low demand conditions. In the illustrative embodiment, the batteries 52 are charged during cruise or low demand conditions.

In some embodiments, the sensors 32 may be spaced apart around the circumference of the inner fan case 46. In other embodiments, the sensors 32 may be arranged around the outer case 44. In the illustrative embodiment, the sensors 32 are distributed in different areas of the flow path 19 as shown in FIG. 3. The sensors 32 measure pressure gradients within the flow path 19. In other embodiments, the sensors 32 may measure other characteristics of the flow of air through the flow path 19.

Based on the measurements from the sensors 32 and/or the detected preprogrammed aircraft maneuvers detected, the controller 34 is configured to individually vary the speed of each of the electric fans 26A, 26B, 26C, 26D. The controller 34 is configured to increase the rotation speed of at least one electric fan 26A, 26B, 26C, 26D included in the auxiliary fan array 22 in response to the pressure measurement from the sensors 32 being above a predetermined threshold. The controller 34 is configured to decrease the rotation speed of at least one electric fan 26A, 26B, 26C, 26D included in the auxiliary fan array 22 in response to the pressure measurement being below the predetermined threshold.

The controller 34 may also be configured to maintain the rotation speed of at least one electric fan 26A, 26B, 26C, 26D included in the auxiliary fan array 22 if the pressure measurements are within the predetermined threshold. Alternatively, the controller 34 may be configured to stop rotation of at least one electric fan 26A, 26B, 26C, 26D included in the auxiliary fan array 22 if the pressure measurements are within the predetermined threshold.

The controller 34 is also configured to detect a preprogrammed aircraft maneuver included in the plurality of preprogrammed aircraft maneuvers on the memory 36. In some embodiments, other sensors on the aircraft may detect different orientations of the aircraft that correspond to one of the maneuvers In the illustrative embodiment, the plurality of electric fans 26A, 26B, 26C, 26D are each configured to pivot relative to an outer case of the primary fan 12 as suggested in FIG. 3. The controller 34 is configured to direct at least one of the electric fans 26A, 26B, 26C, 26D to pivot in response to the pressure measurements from the plurality of sensors 32.

In the illustrative embodiment, each electric fan 26A, 26B, 26C, 26D in the auxiliary fan array 22 may be set to a different rotation speed during use of the gas turbine engine 10 based on the measurements from the sensors 32 and/or the detected preprogrammed aircraft maneuvers. Additionally, each electric fan 26A, 26B, 26C, 26D may be set at a different direction based on the measurements from the sensors 32 and/or the detected preprogrammed aircraft maneuvers.

A method of operating the auxiliary fan system 20 during operation of the gas turbine engine 10 includes several steps. During operation of the gas turbine engine, a flow of air is conducted through the engine 10. The primary fan 12 pushes the air axially aft to provide thrust. The flow of air then enters through an inlet of the engine core 13, where the compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis A and drive the compressor 14 and the primary fan 12.

As the flow of air is conducted through the engine 10, the pressure sensors 32 measure the pressure within the flow path 19 axially forward or upstream of the engine core 13. Based on the pressure measurements being above, below, or within the predetermined threshold, the controller 34 directs the electric fans 26A, 26B, 26C, 26D of the auxiliary fan array 22 to increase, decrease, or maintain rotation speed.

The controller 34 is configured to increase the rotation speed of at least one electric fan 26A, 26B, 26C, 26D included in the auxiliary fan array 22 in response to the pressure measurement from the sensors 32 being above a predetermined threshold. The controller 34 is configured to decrease the rotation speed of at least one electric fan 26A, 26B, 26C, 26D included in the auxiliary fan array 22 in response to the pressure measurement being below the predetermined threshold. The controller 34 is also configured to maintain the rotation speed of at least one electric fan 26A, 26B, 26C, 26D included in the auxiliary fan array 22 if the pressure measurements are within the predetermined threshold.

Alternatively, or in combination with the pressure measurements, the controller 34 is configured to vary the rotation speed of the electric fans 26A, 26B, 26C, 26D in response to detecting a preprogrammed aircraft maneuver included in the plurality of preprogrammed aircraft maneuvers on the memory 36. The controller 34 is configured to direct the auxiliary fan array 22 to change to the corresponding predetermined speed profile in response to detecting the preprogrammed aircraft maneuver.

Alternatively, or in combination with the other control parameters, the method includes pivoting at least one electric fan included in the auxiliary fan array relative to the primary fan to change the direction of the at least one electric fan in response to the pressure measurements and/or the detected preprogrammed aircraft maneuver. The pivoting the fans 26A, 26B, 26C, 26D may be included in the configuration of the corresponding predetermined speed profile. The controller 34 is configured to direct at least one of the electric fans 26A, 26B, 26C, 26D to pivot in response to the pressure measurements from the plurality of sensors 32 and/or the detected preprogrammed aircraft maneuver.

Figure 7:
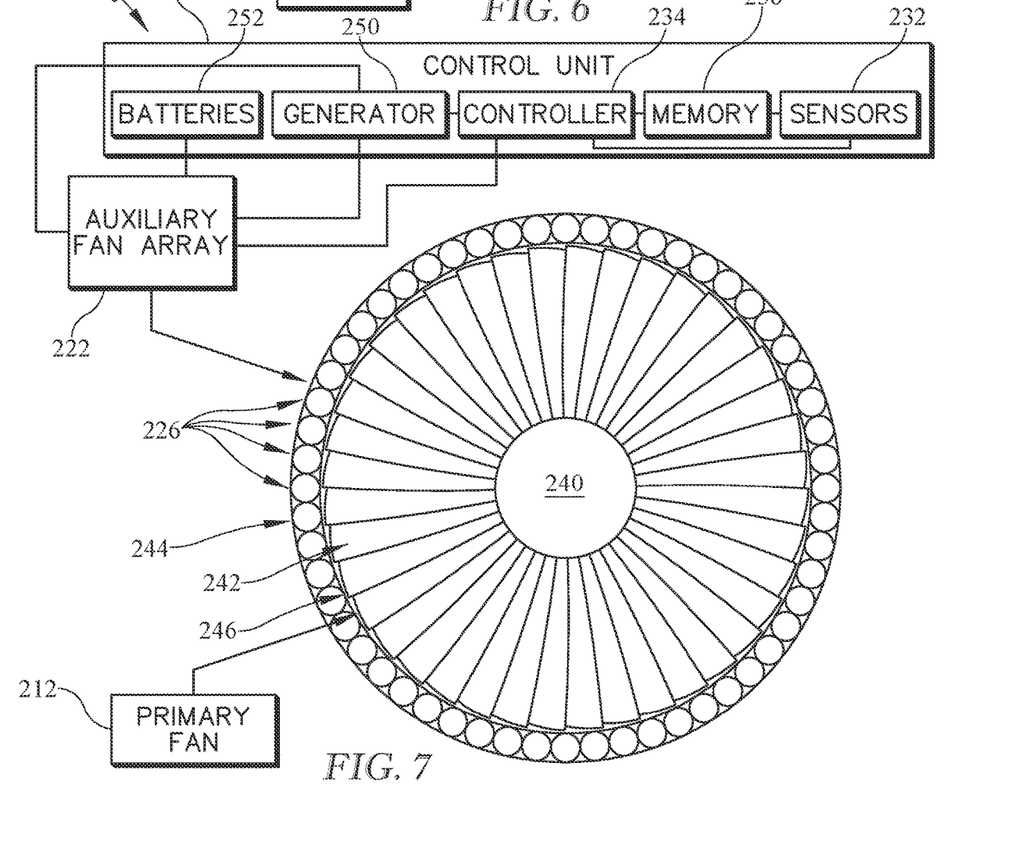
FIG. 7 is a diagrammatic and cross-section view of the gas turbine engine of FIG. 6 showing the auxiliary fan array includes a plurality of electric fans arranged circumferentially around the primary fan radially between the tips of the fan blades and the outer case.

Another embodiment of an auxiliary fan system 220 in accordance with the present disclosure is shown in FIGS. 6 and 7. The auxiliary fan system 220 is substantially similar to the auxiliary fan system 20 shown in FIGS. 1-3 and described herein. Accordingly, similar reference numbers in the 200 series indicate features that are common between the auxiliary fan system 20 and the auxiliary fan system 220. The description of the auxiliary fan system 20 is incorporated by reference to apply to the auxiliary fan system 20, except in instances when it conflicts with the specific description and the drawings of the auxiliary fan system 220.

The auxiliary fan system 220 is included in a gas turbine engine 210 as shown in FIG. 6. The gas turbine engine 210 includes a primary fan 212, an engine core 213, and the auxiliary fan system 220. The primary fan 212 is mounted for rotation about an axis A of the gas turbine engine 210 to provide thrust. The engine core 213 is coupled to the primary fan 212 and configured to drive rotation of the primary fan 212 about the axis A to cause the fan 212 to push air to provide thrust for the gas turbine engine 210. The auxiliary fan system 220 is configured to augment the flow of air through the gas turbine engine 210 to help offset and minimize the pressure and swirl distortions in the gas turbine engine 210.

The auxiliary fan system 220 includes an auxiliary fan array 222 and a control unit 224 as shown in FIGS. 6 and 7. The auxiliary fan array 222 is axially aligned with the primary fan 12 radially outward of the primary fan 212. The control unit 224 is coupled to the auxiliary fan array 222 to individually control the rotation speed of each electric fan 226 included in the auxiliary fan array 222 in response to a pressure differential in the flow path 219 of the gas turbine engine 210 upstream of the engine core 213.

In the illustrative embodiment, the primary fan 212 of the gas turbine engine 210 includes a fan rotor 240, a plurality of fan blades 242, an outer case 244, and an inner fan case 246 as shown in FIGS. 6 and 7. The plurality of fan blades 242 each extend radially outward from the fan rotor 240. The outer case 244 extends circumferentially around the axis A of the gas turbine engine 10 radially outward of the inner fan case 246 to define a portion of the flow path 219 of the gas turbine engine 210. The inner fan case 246 extends circumferentially around the axis A of the gas turbine engine 10 radially outward of the fan blades 242 and radially inward of the outer case 244.

The auxiliary fan array 222 is axially aligned with the primary fan 12 radially outward of the primary fan 212 so that the plurality of electric fans 226 included in the auxiliary fan array 222 are located radially outer ward of the tips of the fan blades 242. In the illustrative embodiment, the auxiliary fan array 222 is located radially between the outer case 244 and the inner fan case 246 as shown in FIGS. 8 and 9.

In the illustrative embodiment, the primary fan 212 has a first diameter and each electric fan 226 of the auxiliary fan array 222 has a second diameter as shown in FIG. 6. The second diameter of each electric fan 226 is less than the first diameter of the primary fan 212.

Figure 8:
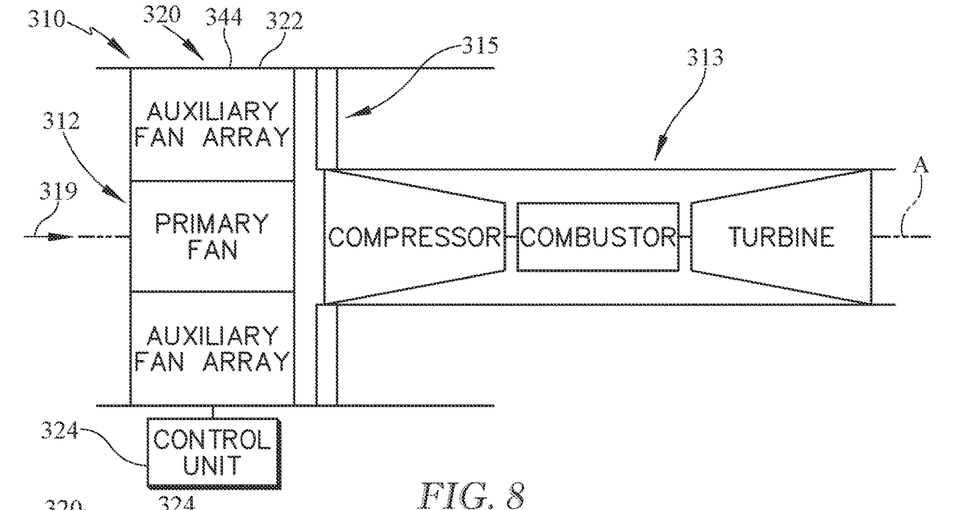
FIG. 8 is a diagrammatic view of another embodiment of an auxiliary fan system in a gas turbine engine showing the auxiliary fan system includes an auxiliary fan array that is axially aligned with the primary fan radially between fan blades of the primary fan and an outer case of the primary fan and a control unit coupled to the auxiliary fan array to individually control the rotation speed of each electric fan included in the auxiliary fan array.
Figure 9:
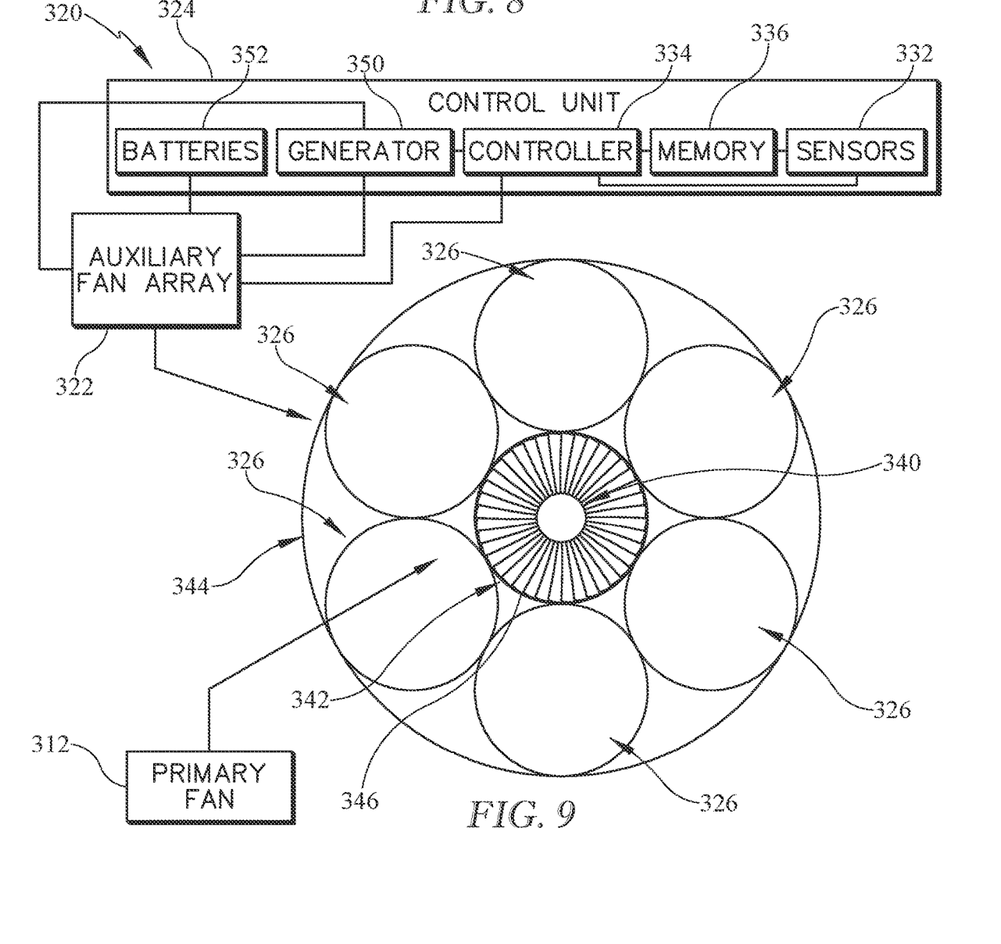
FIG. 9 is a diagrammatic and cross-section view of the gas turbine engine of FIG. 8 showing the auxiliary fan array includes a plurality of electric fans arranged circumferentially around the primary fan radially between the tips of the fan blades and the outer case, and further showing the electric fans are larger in diameter of the electric fans in the embodiment of FIGS. 6 and 7.

The size of the electric fans 226 in the auxiliary fan array 222 may be increased, like as shown in FIGS. 8 and 9, or decreased. If the size of the fans 226 is increased, the number of fans around the circumference of the primary fan 212 may decrease. Conversely, if the size of the fans 226 is decreased, the number of fans around the circumference of the primary fan 212 may increase. The smaller the electric fans 226, the less gaps between the fans 26A, 26B, 26C, 26D in the auxiliary fan array 222.

In some embodiments, the auxiliary fan system 220 may include blocker doors (not shown) for the plurality of electric fans 226. The blocker door may be configured to block flow to the electric fans 226 in the auxiliary fan array 222. If the smaller outer circumference of the fans 226 had a door or other means of blocking off flow in certain operations, the engine 210 may become a variable cycle engine without need for a tip fan platform, or other similar architectures.

Turning again to the control unit 224, the control unit 224 includes a power supply, sensors 232, a controller 234, and a memory 236 as shown in FIG. 9. The power supply is coupled to each of the electric fans 226 to provide power to each of the electric fans 226. The plurality of sensors 232 arranged to measure pressure within the flow path 219 of the gas turbine engine 210 upstream of the engine core 213. The controller 234 is coupled to each of the electric fans 226 and the power supply. The controller 234 is also coupled to the plurality of sensors 232 to receive pressure measurements from the plurality of sensors 232. The memory 236 is coupled to the controller 234 and has a plurality of preprogrammed aircraft maneuvers that each correspond to a predetermined speed profile for the auxiliary fan array 222.

The power supply includes a generator 250 and batteries 252 as shown in FIG. 7. The generator 250 is coupled to the auxiliary fan array 222 to supply power to the auxiliary fan array 222 to drive rotation of the plurality of electric fans 226. The batteries 252 are coupled to the generator 250 to store electricity produced by the generator 250. The batteries 252 are also coupled to the auxiliary fan array 222 to supply power to the auxiliary fan array 222. In the illustrative embodiment, the batteries 252 may supplement the power supplied by the generator 250 to the auxiliary fan array 222 and/or independently supply power to the auxiliary fan array 222.

Based on the pressure measurements and/or the detected preprogrammed aircraft maneuvers, the controller 234 is configured to individually increase, decrease, and/or maintain the speed of each of the electric fans 226. The controller 234 is configured to increase the rotation speed of at least one electric fan 226 included in the auxiliary fan array 222 in response to the pressure measurement from the sensors 232 being above a predetermined threshold. The controller 234 is configured to decrease the rotation speed of at least one electric fan 226 included in the auxiliary fan array 222 in response to the pressure measurement being below the predetermined threshold.

The controller 234 may also be configured to maintain the rotation speed of at least one electric fan 226 included in the auxiliary fan array 222 if the pressure measurements are within the predetermined threshold. Alternatively, the controller 234 may be configured to stop rotation of at least one electric fan 226 included in the auxiliary fan array 222 if the pressure measurements are within the predetermined threshold.

The controller 234 is also configured to detect a preprogrammed aircraft maneuver included in the plurality of preprogrammed aircraft maneuvers on the memory 236. The controller 234 is configured to direct the auxiliary fan array 222 to change to the corresponding predetermined speed profile in response to detecting the preprogrammed aircraft maneuver. The controller 234 may be configured to use a combination of the pressure measurements and the detected preprogrammed aircraft maneuver to control the rotation speeds of each of the electric fans 226.

Another embodiment of an auxiliary fan system 320 in accordance with the present disclosure is shown in FIGS. 8 and 9. The auxiliary fan system 320 is substantially similar to the auxiliary fan systems 20, 220 shown in FIGS. 1-7 and described herein. Accordingly, similar reference numbers in the 300 series indicate features that are common between the auxiliary fan system 20, 220 and the auxiliary fan system 320. The description of the auxiliary fan system 20, 220 is incorporated by reference to apply to the auxiliary fan system 20, 220, except in instances when it conflicts with the specific description and the drawings of the auxiliary fan system 320.

The auxiliary fan system 320 is included in a gas turbine engine 310 as shown in FIG. 8. The gas turbine engine 310 includes a primary fan 312, an engine core 313, and the auxiliary fan system 320. The primary fan 312 is mounted for rotation about an axis A of the gas turbine engine 310 to provide thrust. The engine core 313 is coupled to the primary fan 312 and configured to drive rotation of the primary fan 312 about the axis A to cause the fan 312 to push air to provide thrust for the gas turbine engine 310. The auxiliary fan system 320 is configured to augment the flow of air through the gas turbine engine 310 to help offset and minimize the pressure and swirl distortions in the gas turbine engine 310.

The auxiliary fan system 320 includes an auxiliary fan array 322 and a control unit 324 as shown in FIGS. 8 and 9. The auxiliary fan array 322 is axially aligned with the primary fan 312 radially outward of the primary fan 312. The control unit 324 is coupled to the auxiliary fan array 322 to individually control the rotation speed of each electric fan 326 included in the auxiliary fan array 322 in response to a pressure differential in the flow path 319 of the gas turbine engine 310 upstream of the engine core 313.

In the illustrative embodiment, the electric fans 326 included in the auxiliary fan array 322 are larger than the electric fans 226 in the embodiment of FIGS. 6 and 7. There are also fewer electric fans 326 than in the embodiments of FIGS. 6 and 7. In the illustrative embodiment, there are six electric fans 326 spaced apart circumferentially around the primary fan 312.

In the illustrative embodiment, the primary fan 312 of the gas turbine engine 310 includes a fan rotor 340, a plurality of fan blades 342, an outer case 344, and an inner fan case 346 as shown in FIGS. 8 and 9. The plurality of fan blades 342 each extend radially outward from the fan rotor 340. The outer case 344 extends circumferentially around the axis A of the gas turbine engine 10 radially outward of the fan blades 342 to define a portion of the flow path 319 of the gas turbine engine 310. The inner fan case 346 extends circumferentially around the axis A of the gas turbine engine 10 radially outward of the fan blades 342 and radially inward of the outer case 344.

The auxiliary fan array 322 is axially aligned with the primary fan 12 radially outward of the primary fan 312 so that the plurality of electric fans 326 included in the auxiliary fan array 322 are located radially between the tips of the fan blades 342 and the outer case 344 of the primary fan 312. In the illustrative embodiment, the auxiliary fan array 322 is located radially between the outer case 344 and the inner fan case 346 as shown in FIGS. 8 and 9.

Turning again to the control unit 324, the control unit 324 includes a power supply, sensors 332, a controller 334, and a memory 336 as shown in FIG. 9. The power supply is coupled to each of the electric fans 326 to provide power to each of the electric fans 326. The plurality of sensors 332 arranged to measure pressure within the flow path 319 of the gas turbine engine 310 upstream of the engine core 313. The controller 334 is coupled to each of the electric fans 326 and the power supply. The controller 334 is also coupled to the plurality of sensors 332 to receive pressure measurements from the plurality of sensors 332. The memory 336 is coupled to the controller 334 and has a plurality of preprogrammed aircraft maneuvers that each correspond to a predetermined speed profile for the auxiliary fan array 322.

The power supply includes a generator 350 and batteries 352 as shown in FIG. 9. The generator 350 is coupled to the auxiliary fan array 322 to supply power to the auxiliary fan array 322 to drive rotation of the plurality of electric fans 326. The batteries 352 are coupled to the generator 350 to store electricity produced by the generator 350. The batteries 352 are also coupled to the auxiliary fan array 322 to supply power to the auxiliary fan array 322. In the illustrative embodiment, the batteries 352 may supplement the power supplied by the generator 350 to the auxiliary fan array 322 and/or independently supply power to the auxiliary fan array 322.

Based on the pressure measurements and/or the detected preprogrammed aircraft maneuvers, the controller 334 is configured to individually increase, decrease, and/or maintain the speed of each of the electric fans 326. The controller 334 is configured to increase the rotation speed of at least one electric fan 326 included in the auxiliary fan array 322 in response to the pressure measurement from the sensors 332 being above a predetermined threshold. The controller 334 is configured to decrease the rotation speed of at least one electric fan 326 included in the auxiliary fan array 322 in response to the pressure measurement being below the predetermined threshold.

The controller 334 may also be configured to maintain the rotation speed of at least one electric fan 326 included in the auxiliary fan array 322 if the pressure measurements are within the predetermined threshold. Alternatively, the controller 334 may be configured to stop rotation of at least one electric fan 326 included in the auxiliary fan array 322 if the pressure measurements are within the predetermined threshold.

The controller 334 is also configured to detect a preprogrammed aircraft maneuver included in the plurality of preprogrammed aircraft maneuvers on the memory 336. The controller 334 is configured to direct the auxiliary fan array 322 to change to the corresponding predetermined speed profile in response to detecting the preprogrammed aircraft maneuver. The controller 334 may be configured to use a combination of the pressure measurements and the detected preprogrammed aircraft maneuver to control the rotation speeds of each of the electric fans 326.

Embedded gas turbine engine applications may introduce distortion in the form of pressure gradients and swirl. A fan may need to survive going through different sectors of their circumference with varying level of pressure or swirl magnitudes, which may be difficult to manage for stall or aeromechanical behavior.

In the illustrative embodiment, the gas turbine engine includes an auxiliary fan system 20, 220, 320 radially around a primary fan 12, 212, 312. The auxiliary fan system 20, 220, 320 may allow for different speeds to adjust to various flows around the circumference to help offset the pressure and swirl distortions present.

This allows for optimization of response not present with a single fan being embedded (without tip injection/recirculation at least). The fans of the auxiliary fan system 20, 220, 320 may also be located ahead of a traditional fan to help it survive distortion.

The auxiliary fan system 20, 220, 320 allows the primary fan 12, 212, 312 to adapt to or survive in distortion patterns better than with a single fan and even perhaps than some active technologies such as tip injection. The distributed fans may aid the primary fan 12, 212, 312 in normal operation with uniform speed, but then come into a distortion mitigation regime during maneuvers. In some embodiments, the distributed fans may aid the primary fan 12, 212, 312 during normal operations as well since there may be distorted inlet flow with reduced swirl magnitudes.

The auxiliary fan system 20, 220, 320 may also be acting to mitigate distortion such as with boundary layer ingestion. As the fans 26A, 26B, 26C, 26D, 226, 326 use electric motors, the fans 26A, 26B, 26C, 26D, 226, 326 may be at different speeds and respond nearly instantaneously, as compared to mechanical gear/driveshaft configurations, which may have to be at the same speed and would be challenging to infinitely tune their relationship without complexity of continuously variable transmissions.

Even still, there remains value beyond an embedded or boundary layer injection application. The auxiliary fan system 20, 220, 320 may be useful in addition to embedded applications by potentially acting as a higher bypass ratio fan if the primary fan 12, 212, 312 is driven at low speeds (high enough just to load a low pressure generator). The flow through the core may be minimal, so this may represent a high bypass ratio—without the need for a gear located to the fan—and more variable to suit different missions.

In other embodiments, aircrafts with mechanical fans may rely on inlet guide vanes/full inlet frames to help process incoming distortion and swirl. An off-the-shelf turbofan without such in an embedded application may struggle with distortion and swirl which would not allow an airframe to use its full envelope as intended. In response to the distortion, one may try to mitigate the distortion or try to somehow survive the distortion.

Tools, such as flow control or fins/vortex generators or plasma generators in the inlet, may limit the influence of distortion remaining before the distortion arrives at the fan. Fans with mistuning, improved damping, casing treatments, tip injection, or mechanical design tailored for distortion may empower the fan to be able to handle distortion. Imposing a keep out zone is also a way to respond to distortion. However, with the rise of electrical and hybrid configurations that provide additional architecture options, distributed fans may be included inside a turbofan assembly to replace or augment the traditional fan to respond to distortion by varying individual fan speed to offset the distortion being experienced.

By nature, a single spinning fan may be axisymmetric as the fan faces non-axisymmetric distortions. These may have pockets of low pressure or local swirl vortices, or patterns of pressure that may create forcing on the aerofoil, which may lead to failure. Making a fan robust to these different inputs may be challenging, but if it is not made robust to distortion then its usefulness may be limited by having to avoid maneuvers or not be capable of the full intended envelope.

Instead, the illustrative embodiments use smaller distributed fans 26A, 26B, 26C, 26D, 226, 326 to increase velocity around the circumference locally and offset the distortion. In the illustrative embodiment, the control unit 24, 224, 324 includes sensors and/or control logic to adjust the auxiliary fan array 22, 222, 322 on the fly to different conditions or in anticipation of maneuvers/inputs/programming. This may allow the primary fan 12, 212, 312 to potentially be simpler (less tailoring of the fan to distortion or elimination of tip injection or mistuning) with support of the distributed fans 26A, 26B, 26C, 26D, 226, 326 to aid in overcoming distortion.

The turbofan may drive a generator, which then powers the small electric fans of the auxiliary fan array 22, 222, 322. This may be beneficial in applications where the arrangements of fans may take the shape of the airframe. In other embodiments, a second gas turbine engine or turboshaft may power the generator 50 or another generator coupled to the auxiliary fan system 20, 220, 320.

The distributed fans 26A, 26B, 26C, 26D, 226, 326 may be powered by a generator 50, 250, 350 like as shown in FIGS. 2, 7, and 9. The generator 50, 250, 350 may or may not be embedded in the engine 10, 210, 310. The space between the core 13 and the inner bypass flow path may house a large amount of wires and other supporting infrastructure and controls hardware if the generator 50, 250, 350 is embedded. These would be located aft of outlet guide vanes.

The electric fans 26A, 26B, 26C, 26D, 226, 326 may also help to reduce the difference between optimal design of the fan for take-off power and the best for cruise efficiency by providing auxiliary flow and thrust compared to not having these distributed fans in place. Depending on the design of the engine, the fans 26A, 26B, 26C, 26D, 226, 326 may also be used for reverse thrust if the main fan 12 went to idle/windmill and the fans 26A, 26B, 26C, 26D, 226, 326 were put into full reverse, either just in direction or by variable pitch.

It may be desirable to have auxiliary fans 26A, 26B, 26C, 26D, 226, 326 only on the top or bottom portion of the circumference in a boundary layer ingestion application, where one half of the fan sees repeatedly higher or isolated distortions. Similarly, if the cruise thrust requirements were low, then potentially the primary fan 12 may be put into windmill or very low thrust at a speed just high enough to spin the generator 50 to make power to turn the distributed fans 26A, 26B, 26C, 26D, 226, 326. This may translate to a large bypass ratio as little flow through the core 13 may be needed at such a low pressure/core speed.

The fans 226 may also be smaller and around the outer case, for example. For example, the fans 226 may be used at the fan blisk tip, but also near the opening to the core duct of the engine core 313. Use of the fans 226 may also find synergies with a variable area nozzle to adapt to different mission points and yield efficiency benefits.

A small central blisk fan 212 driven by the engine core 213/low pressure shaft may be surrounded by small distributed fans 226 like as shown in FIGS. 6 and 7. As in the bypass duct, the fans 426 may be more plentiful in number while being smaller and around the outer diameter of the fan 212, with the central fan 212 larger to make up the difference in space. This may reduce the empty space between the outer smaller fans 226, but may still provide a distortion offsetting benefit.

In some embodiments, the auxiliary fan system 220 for the engine 210 may have a door or a flap configured to block flow to the electric fans 226 in the auxiliary fan array 222. If the smaller outer circumference of the fans 226 had a door or other means of blocking off flow in certain operations, the engine 210 may become a variable cycle engine without need for a tip fan platform, or other similar architectures.

The electric fans 226 may be powered by an embedded generator 250 and may be aided by a capacitor or battery 252 for short boosts (take-off, adverse situations) instead of continuous power such as during climb. The primary fan 212 may be optimized for cruise and then the distributed fans 226 may operate primarily to augment power in take-off, or mitigating distortion as needed. In some embodiments, the auxiliary fan system 20, 220, 320 may enable shorter take-offs.

With distributed fans, it may also be possible to move away from a circular cross-section as in a typical single fan configuration. The benefits of an array to vary speed between the locations to respond to distortion is still feasible with non-circular arrays like as shown in FIGS. 2-5. The array may be modified to suit a partial airframe shape or be optimized for a particular inlet design.

As shown in FIGS. 1-5, the auxiliary fan array 22 may include a combination of a primary fan 12 and supplementary distributed electrical fans 26A-D in the parallelogram/diamond shape. This may increase thrust by including additional fans 26A-D around the primary fan 12 in space provided by an embedded application's blended wing body airframe as well as providing the benefit of mitigating distortion through adaptive speeds per each fan 26A, 26B, 26C, 26D.

To mitigate interaction effects and the fans 26A, 26B, 26C, 26D from distorting flow fields between each other, each fan 26A, 26B, 26C, 26D may include a short nacelle 64A, 64B, 64C, 64D projecting axially forward from each fan 26A, 26B, 26C, 26D. Each nacelle 64A, 64B, 64C, 64D may be one radius ahead, for example.

In some embodiments, the fans 26A, 26B, 26C, 26D may be able to tilt or change angle in a holder (like a spherical bearing) with an actuator or similar. In this way, the tilting fans 26A, 26B, 26C, 26D may work to mitigate swirl or allow for more active tailoring of distortion response. This might be easiest to implement and be effective aft of the fan 12 in the bypass/front frame. These could be effectively used like a matched outlet guide vane system, used in place or combined with a matched or variable outlet guide vane setup.

In other embodiments, an array of fans around the circumference (such as in the bypass/front frame) may be used to produce a traveling wave pattern that may be used to break up modes of the fan blisk or aerodynamically mistune it for flutter. This may be done passively (constantly doing) or actively (triggered by blade vibration). As the fan blisk travels, the smaller fans may pulse in a pattern to disrupt other vibrations or responses—such as in A/B configuration going fast/slow. Yet another possibility if an array of smaller electric fans were in-front of or behind a primary large blisk, the array may help a damaged aerofoil by following it around at the rotational speed of the blisk to offset loading on it.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:
a primary fan mounted for rotation about an axis of the gas turbine engine to provide thrust, the primary fan including a fan rotor, a plurality of fan blades that extend radially outward from the fan rotor, an inner fan case that extends circumferentially around the axis of the gas turbine engine radially outward of the plurality of fan blades, and an outer case that extends circumferentially around the axis of the gas turbine engine radially outward of the inner fan case to define a portion of a flow path of the gas turbine engine,
an engine core coupled to the primary fan and configured to drive the primary fan about the axis to cause the fan to push air to provide thrust for the gas turbine engine, the engine core including a compressor configured to rotate about the axis of the gas turbine engine to compress the air that flows from the primary fan, a combustor configured to receive the compressed air from the compressor, and a turbine coupled to the compressor and the primary fan and configured to rotate about the axis of the gas turbine engine in response to receiving hot, high-pressure products of the combustor to drive rotation of the compressor and the fan, and
an auxiliary fan system including an auxiliary fan array located radially between the inner fan case and the outer case of the primary fan and located axially in line with the primary fan and a control unit coupled to the auxiliary fan array, the auxiliary fan array having a plurality of electric fans spaced apart around the axis of the gas turbine engine that are each configured to rotate about a corresponding fan axis to discharge air in the flow path of the gas turbine engine radially outward of the engine core, and the control unit configured to vary individually a rotation speed of each electric fan included in the auxiliary fan array in response to a pressure differential in the flow path of the gas turbine engine upstream of the engine core to minimize pressure and swirl distortions in the gas turbine engine.

2. The gas turbine engine of claim 1, wherein the control unit includes a plurality of sensors arranged to measure pressure within the flow path of the gas turbine engine upstream of the engine core and a controller coupled to the plurality of sensors to receive pressure measurements from the plurality of sensors, the controller configured to increase the rotation speed of at least one electric fan included in the auxiliary fan array in response to the pressure measurement being above a predetermined threshold.

3. The gas turbine engine of claim 2, wherein the controller is configured to decrease the rotation speed of at least one electric fan included in the auxiliary fan array in response to the pressure measurement being below the predetermined threshold.

4. The gas turbine engine of claim 2, wherein the control unit further includes a memory coupled to the controller, the memory including a plurality of preprogrammed aircraft maneuvers that each correspond to a predetermined speed profile for the auxiliary fan array, and the controller is configured to detect a preprogrammed aircraft maneuver included in the plurality of preprogrammed aircraft maneuvers on the memory and direct the auxiliary fan array to change to the corresponding predetermined speed profile corresponding to one of the plurality of preprogrammed aircraft maneuvers in response to detecting the preprogrammed aircraft maneuver.

5. The gas turbine engine of claim 4, wherein the plurality of electric fans are each configured to pivot relative to the outer case of the primary fan and the controller is configured to direct at least one electric fan included in the plurality of electric fans to pivot in response to the pressure measurements from the plurality of sensors and/or the preprogrammed aircraft maneuver.

6. The gas turbine engine of claim 1, wherein the control unit includes a controller and a memory coupled to the controller, the memory including a plurality of preprogrammed aircraft maneuvers that each correspond to a predetermined speed profile for the auxiliary fan array, and the controller configured to detect a preprogrammed aircraft maneuver included in the plurality of preprogrammed aircraft maneuvers on the memory and direct the auxiliary fan array to change to the predetermined speed profile corresponding to one of the plurality of preprogrammed aircraft maneuvers in response to detecting the preprogrammed aircraft maneuver.

7. The gas turbine engine of claim 1, wherein the plurality of electric fans included in the auxiliary fan array include a first set of electric fans having a first diameter, a second set of electric fans having the first diameter and spaced apart circumferentially from the first set of electric fans, a third set of electric fans having a second diameter and located circumferentially between the first set of electric fans and the second set of electric fans, and a fourth set of electric fans having the second diameter and located circumferentially between the first set of electric fans and the second set of electric fans, the second diameter being greater than the first diameter, and the fourth set of electric fans being spaced apart circumferentially from the third set of electric fans.

8. The gas turbine engine of claim 7, wherein the first set of electric fans and the second set of electric fans each have a rotor, blades, and a nacelle, the third set of electric fans and the fourth set of electric fans each have a rotor, blades, and a nacelle, each of the nacelle of the first set of electric fans and the second set of electric fans have a first axial length, and each of the nacelle of the third set of electric fans and the fourth set of electric fans have a second axial length greater than the first axial length.

9. The gas turbine engine of claim 1, wherein the primary fan has a first diameter and the plurality of electric fans included in the auxiliary fan array has a second diameter less than the first diameter.

10. The gas turbine engine of claim 1, wherein the outer case has a non-circular cross-section.

11. A gas turbine engine comprising:
a primary fan mounted for rotation about an axis of the gas turbine engine to provide thrust,
an inner case radially outward and surrounding the primary fan,
an outer case radially outward of the inner case defining a portion of a flow path of the gas turbine engine,
an engine core coupled to the primary fan and configured to drive the primary fan about the axis, the engine core including a compressor, a combustor and a turbine, and
an auxiliary fan system including an auxiliary fan array located radially outward of the primary fan between the inner case and the outer case and a control unit coupled to the auxiliary fan array, the auxiliary fan array having a plurality of electric fans spaced apart around the axis of the gas turbine engine that are each configured to rotate about a corresponding fan axis to discharge air in the flow path radially outward of the engine core, and the control unit configured to vary individually a rotation speed of each electric fan included in the auxiliary fan array in response to a pressure differential in the flow path of the gas turbine engine upstream of the engine core.

12. The gas turbine engine of claim 11, wherein the control unit includes a plurality of sensors arranged to measure pressure within the flow path of the gas turbine engine upstream of the engine core and a controller coupled to the plurality of sensors to receive pressure measurements from the plurality of sensors, the controller configured to increase the rotation speed of at least one electric fan included in the auxiliary fan array in response to the pressure measurement being above a predetermined threshold and to decrease the rotation speed of at least one electric fan included in the auxiliary fan array in response to the pressure measurement being below the predetermined threshold.

13. The gas turbine engine of claim 11, wherein the control unit includes a controller and a memory coupled to the controller, the memory including a plurality of preprogrammed aircraft maneuvers that each correspond to a predetermined speed profile for the auxiliary fan array, and the controller configured to detect a preprogrammed aircraft maneuver included in the plurality of preprogrammed aircraft maneuvers on the memory and direct the auxiliary fan array to change to the corresponding predetermined speed profile corresponding to one of the plurality of preprogrammed aircraft maneuvers in response to detecting the preprogrammed aircraft maneuver.

14. The gas turbine engine of claim 11, wherein the plurality of electric fans are each configured to pivot relative to the primary fan and the control unit is configured to direct at least one electric fan included in the plurality of electric fans to pivot in response to the pressure differential in the flow path of the gas turbine engine upstream of the engine core.

15. The gas turbine engine of claim 11, wherein the auxiliary fan array is axially aligned with the primary fan and the plurality of electric fans included in the auxiliary fan array include a first set of electric fans having a first diameter, a second set of electric fans having the first diameter and spaced apart circumferentially from the first set of electric fans, a third set of electric fans having a second diameter and located circumferentially between the first set of electric fans and the second set of electric fans, and a fourth set of electric fans having the second diameter and located circumferentially between the first set of electric fans and the second set of electric fans, the second diameter being greater than the first diameter, and the fourth set of electric fans being spaced apart circumferentially from the third set of electric fans.

16. The gas turbine engine of claim 15, wherein the first set of electric fans and the second set of electric fans each have a rotor, blades, and a nacelle, the third set of electric fans and the fourth set of electric fans each have a rotor, blades, and a nacelle, each of the nacelle the nacelles of the first set of electric fans and the second set of electric fans have a first axial length, and each of the nacelle of the third set of electric fans and the fourth set of electric fans have a second axial length greater than the first axial length.

17. The gas turbine engine of claim 11, wherein the primary fan has a first diameter and the plurality of electric fans included in the auxiliary fan array has a second diameter less than the first diameter.

18. The gas turbine engine of claim 11, further comprising an outer engine case arranged around the primary fan, the engine core, and the auxiliary fan array, wherein the outer engine case has a non-circular cross-section.

19. A method comprising:
providing a gas turbine engine comprising a primary fan mounted for rotation about an axis to provide thrust, an inner case radially outward and surrounding the primary fan, an outer case radially outward of the inner case defining a portion of a flow path of the gas turbine engine, an engine core coupled to the primary fan and configured to drive the primary fan about the axis, the engine core including a compressor, a combustor and a turbine, and an auxiliary fan system, the auxiliary fan system including an auxiliary fan array located radially outward of the primary fan between the inner case and the outer case having a plurality of electric fans spaced apart around the axis that are each configured to rotate about a corresponding fan axis to discharge air in the flow path radially outward of the engine core, conducting a flow of air through the flow path of the gas turbine engine, measuring pressure of the flow of air in the flow path of the gas turbine engine axially forward of the engine core, and varying a rotation speed of at least one electric fan included in the auxiliary fan array in response to the pressure measurements being above or below a predetermined threshold to minimize pressure and swirl distortions in the gas turbine engine.

20. The method of claim 19, wherein the auxiliary fan system further includes a memory having a plurality of preprogrammed aircraft maneuvers that each correspond to a predetermined speed profile for the auxiliary fan array, and wherein the method further comprises detecting a preprogrammed aircraft maneuver included in the plurality of preprogrammed aircraft maneuvers stored on the memory and directing the auxiliary fan array to change to the corresponding predetermined speed profile corresponding to one of the plurality of preprogrammed aircraft maneuvers in response to detecting the preprogrammed aircraft maneuver.

\* \* \* \* \*